United States Patent
Cox et al.

(10) Patent No.: US 7,016,364 B2
(45) Date of Patent: Mar. 21, 2006

(54) POWER POOLING IN NETWORK DOWNSTREAM DATA TRANSMISSION

(75) Inventors: Timothy F. Cox, Palo Alto, CA (US); John E. Ohlson, Mountain View, CA (US); Francis D. Natali, Port Townsend, WA (US); Jing Shiang Cheng, Saratoga, CA (US)

(73) Assignee: Alcatel Canada Inc., Kanata (CA)

( * ) Notice: Subject to any disclaimer, the term of this patent is extended or adjusted under 35 U.S.C. 154(b) by 755 days.

(21) Appl. No.: 09/849,023

(22) Filed: May 4, 2001

(65) Prior Publication Data

US 2002/0163923 A1 Nov. 7, 2002

(51) Int. Cl.
*H04L 12/56* (2006.01)

(52) U.S. Cl. ............... 370/412; 370/428; 370/349; 455/513; 455/574

(58) Field of Classification Search ........... 370/203, 370/285, 328, 330, 338, 465, 335, 412; 455/522, 455/69, 450, 512, 513, 452.2
See application file for complete search history.

(56) References Cited

U.S. PATENT DOCUMENTS 6,064,659 A 5/2000 Rohani et al. ............ 370/318
6,205,150 B1 * 3/2001 Ruszczyk ............... 370/412
6,317,416 B1 * 11/2001 Giroux et al. ............ 370/232
6,374,117 B1 * 4/2002 Denkert et al. ........... 455/522
6,775,256 B1 * 8/2004 Hill et al. ................ 370/335

FOREIGN PATENT DOCUMENTS

DE 19839633 3/2000
WO WO 0021322 4/2000

* cited by examiner

*Primary Examiner*—Bob Phunkulh
*Assistant Examiner*—Robert W. Wilson
(74) *Attorney, Agent, or Firm*—Jim Zegeer

(57) ABSTRACT

Data packets are selected for simultaneous transmission to multiple users using a transmitter with limited transmission power by first establishing transmission power requirements for each user, receiving in a queue a plurality of data packets for transmission to one or more users, and selecting one or more data packets for transmission in a composite burst with cumulative power for the selective packets not exceeding the limited transmission power. Data packets are selected for sequential composite bursts until all data packets in the queue have been transmitted, at which time transmission ceases until more incoming packets arrive at the queue. In selecting data packets for transmission, data packets which have previously been delayed in transmission can be given priority as well as priority based on quality of service subscribed by each user. Additionally a predetermined priority weight can be assigned to data packets and used for selection.

24 Claims, 1 Drawing Sheet

POWER POOLING IN NETWORK DOWNSTREAM DATA TRANSMISSION

BACKGROUND OF THE INVENTION

This invention relates generally to the transmission of data to multiple users, and more particularly the invention relates to a power efficient method of simultaneously transmitting a plurality of data packets to multiple users.

In a star configured data network topology, the downstream transmission of data is emitted from the base station, located at the hub of the star, to the subscriber stations located at the points of the star. One of the physical characteristics of the downstream transmission that is often constrained is the emitted power, either average or peak or both. These constraints are usually derived from regulatory limits, transmission equipment capabilities, or operator cooperative agreements.

The very nature of a network suggests that the data transmitted to the subscriber stations must share the transmission medium resources. One of the critical resources used in the downstream transmission is the total power of the transmitter. In time division multiple access (TDMA) each user is assigned a time slot during which full power can be devoted for transmitting to one user. This is not power efficient since some users require less than full available power. In frequency division multiple access (FDM), each user has full-time use of a limited portion of the transmission bandwidth.

Orthogonal direct sequence spread spectrum or orthogonal code division multiple access (OCDMA) allows each user to use the full bandwidth full time. In this transmission mode, a plurality of data packets is assembled for coincident transmission. Each data packet is directly spread by a separate orthogonal code sequence that is assigned to the recipient, thus creating a transmission burst associated with each data packet. Further, each transmission burst is assigned a power level that will insure proper reception at the intended subscriber station. All power scaled transmission bursts are combined to form a composite burst that is sent out as a downstream transmission.

Given this manner of downstream transmission generation, there is a difficulty encountered when some form of power limitation exists. To conform to the power limit, the base station may reduce power proportionally for all transmission bursts in the composite or selectively eliminate some transmission bursts to reduce the composite power and thereby meet the limit. In the case of a proportional reduction of all transmission bursts, the link performance requirement may not be met and the linked users can experience unacceptable error rates. In the other case where selective elimination occurs, those transmission bursts included in the composite have data packet integrity, but those selected for elimination are lost. In either case the capacity of a network is limited due to the loss of data integrity at the receive end or the loss of entire packets at the transmit end.

SUMMARY OF THE INVENTION

In accordance with the present invention, a method of simultaneously transmitting data packets to multiple users using a limited transmission power comprises the steps of establishing transmission power requirements for each user, receiving in a queue a plurality of data packets for transmission to one or more users, and selecting one or more data packets for transmission in a composite burst with the cumulative power for the selected packets not exceeding the limited transmission power. The selection of one or more data packets for transmission is repeated until all data packets in the queue have been transmitted in one or more transmission bursts.

In a preferred embodiment the step of establishing transmission power requirements for each user includes determining a signal to noise ratio in the transmission link from the hub to each user whereby requisite power can be determined for desired level of data reception. Further, the step of selecting one or more data packets for transmission can give priority to data packets which have been delayed in the queue. Further, data packets can be given priority based upon quality of service to which a user has subscribed and to a priority weight based on explicit prioritization of packets.

The invention is particularly applicable to OCDMA transmissions and will be described with reference thereto. However, the invention is applicable to other transmission systems including FDM where simultaneous transmission to multiple users is permitted.

The invention and objects and features thereof will be more readily apparent from the detailed description and appended claims when taken with the drawings.

DESCRIPTION OF THE SPECIFIC EMBODIMENTS

Figure 1:
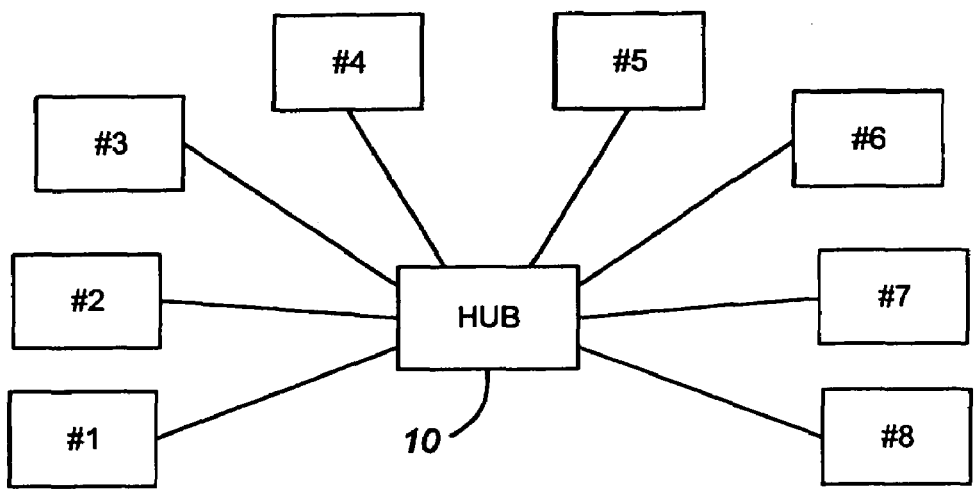
FIG. 1 is a functional block diagram of a star configured data network topology.

FIG. 1 is a functional block diagram of a star configured data network topology for downstream transmission of data from a hub 10 to multiple users identified as No. 1 through No. 8. Hub 10 typically has a transmitter for the wireless transmission of data using a signal which is broadcast to all users. As described above, with orthogonal code division multiple access (OCDMA) a plurality of data packets destined for one or more users is assembled for coincident transmission. Each data packet is directly spread by a separate orthogonal code sequence that is assigned to each recipient user, thus creating a transmission burst associated with each data packet. Further, each transmission burst is assigned a power level that will insure proper reception at the intended subscriber. Typically the assigned power level is determined by the signal to noise ratio in the transmission link from the hub to each user whereby requisite power can be determined for a desired level of data reception. The power scaled transmission bursts are combined to form a composite burst that is sent out as a downstream transmission to all users.

Figure 2:
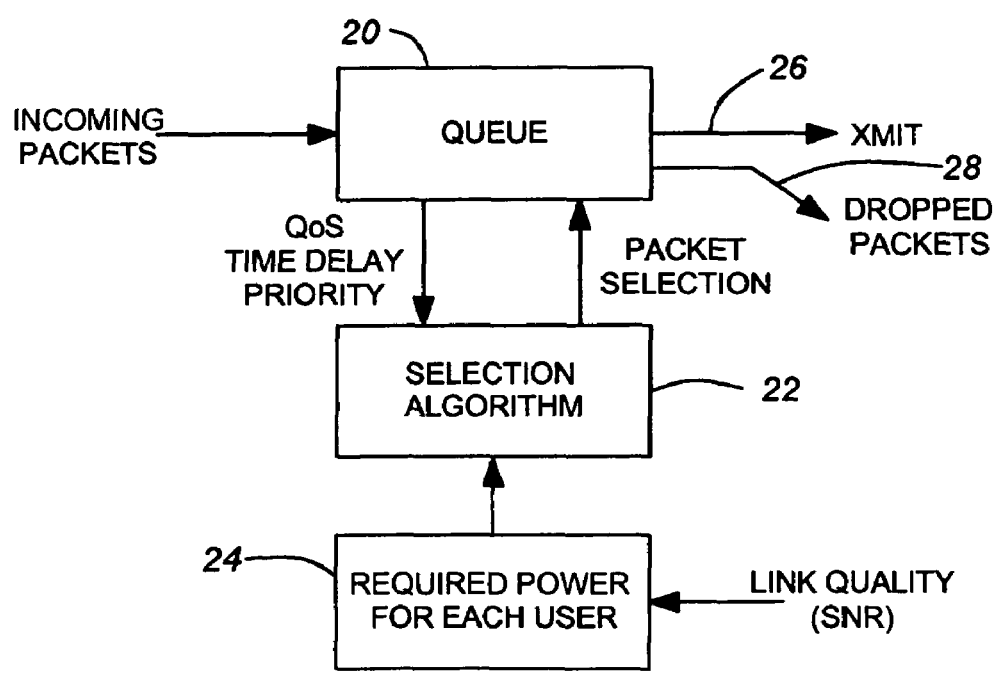
FIG. 2 is a functional block diagram of packet selection apparatus in accordance with one embodiment of the invention.

As noted above, given this manner of downstream transmission there is difficulty encountered when some form of power limitation exists at the hub. In accordance with the present invention data packets destined for one or more users are selected for each composite burst whereby the fixed transmission power of the hub is not exceeded for each burst. The data packet selection in accordance with one embodiment of the invention is illustrated in the functional block diagram of FIG. 2. Incoming data packets received at hub 10 are placed in a queue 20, and each data packet provides information to a selection algorithm 22 including user destination and other information such as quality of service to which the end user has subscribed, any delay within queue 20 as identified by a flag associated with the packet, and any priority associated with the data packet. Selection algorithm 22 also receives a measure of required transmission power for each user based on a measure of link quality from the hub to the user which can be the measured signal to noise ratio of the user link. Selection algorithm 22 then selects one or more data packets for transmission in a composite burst so that the transmission power of the hub is not exceeded. The composite data burst is then transmitted as shown at 26. Further, data packets which have been delayed for a predetermined period of time, for example, due to power requirements exceeding the hub transmission power or errors in the data packet addresses, are dropped at 28 thereby freeing queue 20 for more incoming data packets.

Figure 3:
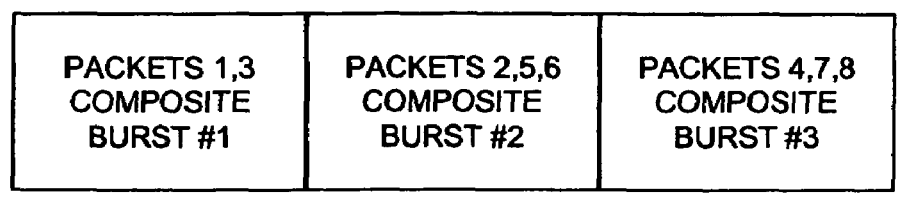
FIG. 3 illustrates three composite bursts, each containing one or more data packets within a fixed transmission power of a hub.

As shown in FIG. 3 the data packets are selected and assembled in composite bursts for sequential transmission from hub 10 to the user subscribers. Assume that eight data packets have arrived in queue 20 and selection algorithm 22 has the power requirements (in power units) required for each data packet recipient is as follows:

Data packets 1, 2, and 5—2 power units each

Data packets 3 and 4—3 power units each

Data packets 6, 7, 8—1 power unit each

Assume also that hub 10 has a power limit of 5 power units. Selection algorithm 22 might then select data packets 1 and 3 for composite burst No. 1, data packets 2, 5, and 6 for composite burst No. 2, and data packets 4, 7 and 8 for composite burst No. 3. Using this selection criteria based solely on required power for each user, each composite burst would use the full 5 power units of the hub transmitter. In so doing data packets 2, 5, and 6 are delayed one composite burst, and packets 4, 7 and 8 are delayed two composite bursts, assuming that all data packets arrived in queue 20 at the same time. Assuming that other priority criteria were used including quality of service for a priority weighting, data packet 4 might be selected before data packet 3 for inclusion in composite burst No. 1 if data packet 4 had a higher priority level. This simple example has only a few packets in each burst, but there may be tens or hundreds of packets in a burst.

The use of selective delay in constructing composite data bursts and pooling the power requirements of each data packet so that the power limit of the composite burst is observed is particularly applicable to OCDMA data transmission. However, the method can be applied to other transmission schemes such as frequency division multiple access where simultaneous transmission of data packets is permitted. While delay is introduced into the transmission of the data packets, the selection algorithm can give priority to delayed data packets so that a maximum delay allowable for any one data packet is not exceeded. In high speed data systems a delay of a few bursts is usually inconsequentially small with respect to the overall latency allowed.

Thus, while the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of simultaneously transmitting data packets to multiple users using limited transmission power comprising the steps of:
    a) establishing transmission power requirements for each user including determining a signal to noise ratio in the transmission link to each user whereby requisite power is determined for a desired level of data reception,
    b) receiving in a queue a plurality of data packets for transmission to one or more users,
    c) selecting data packets for transmission in a composite burst with cumulative power for the selected packets not exceeding said limited transmission power,
    d) transmitting the selected data packets in said composite burst within the limited transmission power, and
    e) repeating step c) until all data packets in the queue have been transmitted.

2. The method as defined in claim 1 wherein step c) includes identifying data packets which have been delayed in transmission, and giving priority in selection to delayed data packets.

3. The method as defined by claim 2 wherein step c) further includes assigning a priority weight to a user based on quality of service subscribed by said user.

4. The method as defined by claim 3 wherein step c) further includes assigning a priority weight based on explicit prioritization of packets.

5. The method as defined by claim 3 wherein each packet is directly spread by a separate orthogonal code sequence for simultaneous multiple access transmission.

6. The method as defined by claim 3 wherein each packet is assigned to a different carrier frequency for simultaneous multiple access transmission.

7. The method as defined by claim 1 wherein step c) further includes assigning a priority weight to a user based on quality of service subscribed by said user.

8. Apparatus for selecting data packets for simultaneous transmission to multiple users using a limited transmission power comprising:
    a) a memory for receiving in a queue a plurality of data packets for transmission to one or more users,
    b) power determining means for establishing power requirements for transmitting data to each user based on signal to noise ratio in each link to each user, and
    c) data packet selection means for selecting data packets for transmission in a composite burst with cumulative power for the selected packets not exceeding the limited transmission power, the selecting means delaying packets as necessary to accommodate the limited transmission power.

9. Apparatus as defined by claim 8 wherein the selection means gives priority in selection to delayed data packets.

10. Apparatus as defined by claim 8 wherein the selection means gives priority in selection to users based on quality of service.

11. Apparatus as defined by claim 8 wherein the selection means gives priority in selection to preassigned explicit priority of packets.

12. Apparatus as defined by claim 8 wherein the selection means gives priority in selection to delayed data packets, quality of service subscribed by each user, and explicit priority of packets.

13. A method of power pooling in network downstream data transmission and simultaneously transmitting data packets to multiple users using limited transmission power comprising the steps of:

a) establishing transmission power requirements for each user, including determining a signal to noise ratio in the transmission link to each user whereby requisite power requirement for the data packets is determined, b) receiving in a queue a plurality of data packets for transmission to one or more users, creating a transmission burst for each data packet, and power-scaling the burst based on the respective transmission power requirement, c) grouping one or more power scaled bursts in a composite burst using a prioritization scheme so that the cumulative power for the composite burst does not exceed the limited transmission power, d) transmitting the selected data packets in a composite burst within the limited transmission power, and e) repeating step c) and d) until all data packets in the queue have been transmitted.

14. The method as defined by claim 13 wherein step c) includes identifying transmission bursts which have been delayed in transmission, and prioritizing the transmission bursts based on the delay.

15. The method as defined by claim 13 wherein step c) includes assigning a priority weight to each transmission burst based on quality of service subscribed by the user of the respective data packet.

16. The method as defined by claim 13 wherein step c) further includes assigning a priority weight to each transmission burst based on a priority assigned to the respective data packet.

17. The method as defined by claim 13 wherein each transmission burst is obtained by directly spreading the respective data packet using a separate orthogonal code sequence.

18. The method as defined by claim 13 wherein step c) includes identifying the number of delays for each data packet which has been delayed in transmission, and assigning a highest priority to the transmission bursts with the highest number of delays.

19. The method as defined by claim 13 wherein step c) includes assigning a priority weight to each transmission burst based on quality of service subscribed by a user of the respective data packet, on a priority assigned to the respective data packet and on the number of times the respective data has been delayed.

20. Apparatus for selecting data packets for simultaneous transmission to multiple users using a limited transmission power comprising:

a) a memory for receiving in a queue a plurality of data packets for transmission to one or more users, b) power determining means for establishing power requirements for transmitting data to each user based on signal to noise ratio in each link to each user, c) means for generating a transmission burst for each data packet based on the respective power requirements, and d) selection means for selecting one or more transmission bursts and grouping the selected transmission bursts for transmission in a composite burst with the cumulative power for the selected packets not exceeding the limited transmission power, the selection means delaying packets as necessary to accommodate the limited transmission power.

21. Apparatus as defined by claim 20 wherein the selection means gives priority in selection to delayed data packets.

22. Apparatus as defined by claim 20 wherein the selection means gives priority in selection to a user based on quality of service.

23. Apparatus as defined by claim 20 wherein the selection means gives priority in selection of the transmission bursts for a certain composite burst based on the priority of the packets.

24. Apparatus as defined by claim 20 wherein the selection means gives priority in selection to delayed data packets, quality of service subscribed by a user, and explicit priority of packets.

* * * * *